US011967239B2

United States Patent
Tang et al.

(10) Patent No.: US 11,967,239 B2
(45) Date of Patent: Apr. 23, 2024

(54) SYSTEMS AND METHODS FOR ORDER DISPATCHING AND VEHICLE REPOSITIONING

(71) Applicant: Beijing DiDi Infinity Technology and Development Co., Ltd., Beijing (CN)

(72) Inventors: Xiaocheng Tang, San Mateo, CA (US); Fan Zhang, Beijing (CN); Zhiwei Qin, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 540 days.

(21) Appl. No.: 17/182,721

(22) Filed: Feb. 23, 2021

(65) Prior Publication Data

US 2022/0270488 A1 Aug. 25, 2022

(51) Int. Cl.
*G08G 1/00* (2006.01)
*G06F 18/21* (2023.01)
*G06Q 10/04* (2023.01)
*G06Q 10/0631* (2023.01)
*G06Q 50/30* (2012.01)

(52) U.S. Cl.
CPC .......... *G08G 1/202* (2013.01); *G06F 18/217* (2023.01); *G06Q 10/04* (2013.01); *G06Q 10/06313* (2013.01); *G06Q 50/30* (2013.01)

(58) Field of Classification Search
CPC .................... G06Q 10/06313; G06Q 50/30
See application file for complete search history.

(56) References Cited

U.S. PATENT DOCUMENTS

| 9,293,048 | B2* | 3/2016 | Fowler | G08G 1/202 |
| 9,945,674 | B2* | 4/2018 | Uno | G01C 21/20 |
| 2009/0327011 | A1* | 12/2009 | Petroff | G05D 1/0221 |
| | | | | 705/5 |
| 2016/0223337 | A1* | 8/2016 | Uno | G01C 21/3626 |
| 2019/0026597 | A1* | 1/2019 | Zeng | G05D 1/0274 |
| 2020/0160251 | A1* | 5/2020 | Wynter | G08G 1/202 |

(Continued)

FOREIGN PATENT DOCUMENTS

CN 111862579 A * 10/2020 ........... G08G 1/0104

OTHER PUBLICATIONS

Translation of CN 111862579 A.*

(Continued)

*Primary Examiner* — Tyler J Lee
(74) *Attorney, Agent, or Firm* — Sheppard Mullin Richter & Hampton LLP

(57) ABSTRACT

A unified learning approach for large-scale ride-hailing is described, the approach includes obtaining an offline state value network for predicting a value of a vehicle state, the offline state value network being trained based on a plurality of historical vehicle trajectories; initializing an online state value network and dispatching a plurality of vehicles according to the online state value network for a period of time; training the online state value network based on vehicle states of the plurality of vehicles before and after the dispatching and rewards associated with the dispatching; ensembling the trained online state value network and the offline state value network to obtain an ensembled online state value network; and dispatching the plurality of vehicles according to the ensembled online state value network.

20 Claims, 11 Drawing Sheets

(56) References Cited

U.S. PATENT DOCUMENTS

2021/0272036 A1* 9/2021 Conroy .............. G08G 1/0112
2022/0044570 A1* 2/2022 Azagirre Lekuona ......................
                                                    G06Q 50/30

OTHER PUBLICATIONS

Geoffrey Hinton et al., "Distilling the Knowledge in a Neural Network," NIPS Deep Learning and Representation Learning Workshop, 2015.

Diederik P. Kingma et al., "Adam: A Method for Stochastic Optimization," Y. Bengio and Y. LeCun, Editors, 3rd International Conference on Learning Representations, ICLR 2015, San Diego, CA, USA, May 7-9, 2015, Conference Track Proceedings, 2015.

Volodymyr Mnih et al., "Human-level control through deep reinforcement learning," Nature, vol. 518(7540), Feb. 26, 2015, pp. 529-533.

James Munkres, "Algorithms for the Assignment and Transportation Problems," Journal of the Society for Industrial and Applied Mathematics, vol. 5, No. 1, Mar. 1957, pp. 32-38.

Xiaocheng Tang et al., "A Deep Value-network Based Approach for Multi-Driver Order Dispatching," Proceedings of the 25th ACM SIGKDD International Conference on Knowledge Discovery & Data Mining, KDD '19, Aug. 4-8, 2019, Anchorage, AK, pp. 1780-1790.

Hado van Hasselt et al., "Deep Reinforcement Learning with Double Q-Learning," Proceedings of the 30th AAAI Conference on Artificial Intelligence (AAAI-16), 2016, pp. 2094-2100.

Zhaodong Wang et al., "Deep Reinforcement Learning with Knowledge Transfer for Online Rides Order Dispatching." IEEE International Conference on Data Mining. IEEE, 2018.

Zhe Xu et al., "Large-Scale Order Dispatch in On-Demand Ride-Hailing Platforms: A Learning and Planning Approach," Proceedings of the 24th ACM SIGKDD International Conference on Knowledge Discovery & Data Mining, KDD 2018, Aug. 19-23, 2018, London, United Kingdom, pp. 905-913.

Kaixiang Lin et al., "Efficient Large-Scale Fleet Management via Multi-Agent Deep Reinforcement Learning," Proceedings of the 24th ACM SIGKDD International Conference on Knowledge Discovery & Data Mining, KDD'18, Aug. 19-23, 2018, London, United Kingdom, ACM, pp. 1774-1783.

Ryan Lowe et al., "Multi-Agent Actor-Critic for Mixed Cooperative-Competitive Environments," Proceedings of the 31st International Conference on Neural Information Processing Systems, NIPS'17, Red Hook, NY, USA, 2017. Curran Associates Inc., pp. 6382-6393.

Takuma Oda et al., "MOVI: A Model-Free Approach to Dynamic Fleet Management," IEEE Infocom 2018—IEEE Conference on Computer Communications, IEEE, 2018, pp. 2708-2716.

Erhun Özkan et al., "Dynamic Matching for Real-Time Ride Sharing," Stochastic Systems, vol. 10, No. 1, Mar. 2020, pp. 29-70.

Zhenyu Shou et al., "Optimal Passenger-Seeking Policies on E-hailing Platforms Using Markov Decision Process and Imitation Learning," Transportation Research Part C: Emerging Technologies, 111:91-113, Feb. 2020.

Satinder Singh et al., "Convergence Results for Single-Step On-Policy Reinforcement-Learning Algorithms." Machine Learning, 38(3):287-308, 2000.

Richard S. Sutton et al., "Reinforcement Learning: An Introduction," vol. 1. The MIT Press Cambridge, Massachusetts, 1998.

Ardi Tampuu et al., "Multiagent Cooperation and Competition with Deep Reinforcement Learning," PLOS ONE, 12(4):1-15, Apr. 2017.

Charles Truong et al., "Selective Review of Offline Change Point Detection Methods," Signal Processing, 167:107299, 2020.

Chiwei Yan et al., "Dynamic Pricing and Matching in Ride-Hailing Platforms," Naval Research Logistics, 2019.

* cited by examiner

400

1: Given: the ensemble weight $1 > \omega > 0$, the reposition threshold $C > 0$ (usually chosen between 150 and 300).
2: Given: the offline evaluated value function $V_{ope}$.
3: Compute the set $\mathcal{E}$ containing the changing time points to re-ensemble.
4: Initialize the state value network $V$ with random weights $\theta$.
5: for the dispatch round $t = 1, 2, \cdots, N$ do
6:     if $t \in \mathcal{E}$ then
7:         $\forall s, V_\theta(s) \leftarrow \omega V_\theta(s) + (1-\omega)V_{ope}^t(s)$.
8:     end if
9:     Solve the dispatch problem (7) given the current value $V_\theta$.
10:     if $t \mod C = 0$ then
11:         Collect all drivers with idle time exceeding $C$ time steps.
12:         Compute the destination distribution (9) for each driver given the current value $V_\theta$.
13:         Reposition each driver stochastically according to the distribution.
14:     end if
15:     Obtain the system state $\mathcal{D}_D$, $\mathcal{D}_I$ and $\mathcal{D} = \mathcal{D}_D \cup \mathcal{D}_I$.
16:     Construct the gradient of the learning objective (4), i.e., $\nabla L(\mathcal{D}; \theta)$ based on the current system state $\mathcal{D}$.
17:     Update the state value network by performing a gradient descent step on $\theta$, e.g., $V_\theta \leftarrow V_\theta - \alpha \nabla L(\mathcal{D}; \theta)$
18: end for
19: return $V$

FIG. 4A

SYSTEMS AND METHODS FOR ORDER DISPATCHING AND VEHICLE REPOSITIONING

TECHNICAL FIELD

The disclosure relates generally to vehicle dispatching in a ride-hailing platform, specifically, real-time order dispatching and vehicle repositioning in a mobility-on-demand (MoD) platform with reinforcement learning.

BACKGROUND

The optimization of order dispatching and vehicle repositioning has been drawing increasing attention in both academia and industry for its potential to achieve high-performance operations in Mobility-on-Demand (MoD), or online ride-hailing platforms, which are increasingly becoming essential components of the modern transit infrastructure. Order dispatching and vehicle repositioning, as key operational functions of MoD systems and with direct access to an abundant amount of real-time transit information, provide promises to greatly reduce inefficiencies of limited supply (drivers) and asymmetric demand (passengers) across time and space in transportation systems.

Existing works usually optimize either order dispatching or vehicle repositioning separately, leading to potentially suboptimal results. Furthermore, the order dispatching and vehicle repositioning in recent works are generally based on dispatching policies learned/trained offline through historical data. Particularly, the dispatching policies estimate a spatio-temporal value function representing drivers' future returns given a current state from historical driver trajectories using an offline policy evaluation method. During online planning, these offline-learned policies are fixed and thus usually much less responsive to high variances and irregularities in a vehicle fleet. On the other hand, purely online-learned dispatching policies are often over-responsive to environmental changes and thus unable to maintain robustness.

SUMMARY

Various embodiments of the specification include, but are not limited to, cloud-based systems, methods, and non-transitory computer-readable media for vehicle dispatching in ride-hailing platforms.

In some embodiments, a computer-implemented method comprises obtaining an offline state value network for predicting a value of a vehicle state, the offline state value network being trained based on a plurality of historical vehicle trajectories; initializing an online state value network and dispatching a plurality of vehicles according to the online state value network for a period of time; training the online state value network based on vehicle states of the plurality of vehicles before and after the dispatching and rewards associated with the dispatching; ensembling the trained online state value network and the offline state value network to obtain an ensembled online state value network; and dispatching the plurality of vehicles according to the ensembled online state value network, e.g., for a next period time.

In some embodiments, the method further comprises training the offline state value network. The training may comprise: for each vehicle state transition extracted from the plurality of historical vehicle trajectories, determining, using the offline state value network, a first vehicle state value before the each vehicle state transition and a second vehicle state value after the each vehicle state transition, constructing an objective function based on a squared error of the first vehicle state value, the second vehicle state value, and a reward associated with the each vehicle state transition; and updating parameters of the offline state value network to minimize the objective function.

In some embodiments, the each vehicle state transition comprises an initial vehicle state, a next vehicle state, and the reward for transitioning from the initial vehicle state to the next vehicle state.

In some embodiments, the determining the first vehicle state value using the offline state value network comprises: inputting the initial vehicle state and a timestamp associated with the initial vehicle state into the offline state value network to determine the first vehicle state value.

In some embodiments, the offline state value network comprises a series of state value functions corresponding to a series of time points.

In some embodiments, the ensembling the trained online state value network and the offline state value network comprises: ensembling the trained online state value network and one of the series of state value functions corresponding to a current time point.

In some embodiments, the training the online state value network based on vehicle states of the plurality of vehicles before and after the dispatching and rewards associated with the dispatching comprises: for each of the plurality of vehicles: determining a first vehicle state value using the online state value network based on the vehicle state before the dispatching; determining a second vehicle state value using the online state value network based on the vehicle state after the dispatching; determining a temporal difference (TD) error based on the first vehicle state value, the second vehicle state value, and a reward associated with the dispatching; and constructing an objective function based on the plurality of TD errors; and updating parameters of the online state value network using gradient descent to minimize the objective function.

In some embodiments, an episode of vehicle dispatching comprises a plurality of dispatch rounds, the training of the online state value network is performed after every first predetermined number of dispatch rounds, and the ensembling of the trained online state value network and the offline state value network is performed after every second predetermined number of dispatch rounds, the second predetermined number being greater than the first predetermined number.

In some embodiments, the method further comprises determining, within an episode of vehicle dispatching, a plurality of time points for ensembling; and the ensembling the trained online state value network and the offline state value network comprises: determining whether a current time point is one of the plurality of time points; and in response to the current time point being one of the plurality of time points, performing the ensembling of the trained online state value network and the offline state value network.

In some embodiments, the dispatching the plurality of vehicles comprises: dispatching one or more of the plurality of vehicles to serve one or more pending ride orders and/or repositioning one or more of the plurality of vehicles.

In some embodiments, the repositioning of one or more vehicles is performed at a lower frequency than the dispatching of one or more vehicles to serve the one or more pending ride orders.

In some embodiments, the dispatching the one or more of the plurality of vehicles to serve the one or more pending ride orders comprises: for each dispatching pair comprising a pending ride order and one of the one or more vehicles, determining a dispatching value using the online state value network; constructing an objective function comprising a plurality of dispatching values respectively corresponding to a plurality of decision variables; determining the plurality of decision variables that maximizes the objective function; and dispatching the one or more of the plurality of vehicles to serve the one or more pending ride orders according to the plurality of decision variables.

In some embodiments, the repositioning the one or more of the plurality of vehicles comprises: identifying one or more of the plurality of vehicles with idle time exceeding a time threshold; for each of the one or more identified vehicles, determining a plurality of repositioning values corresponding to repositioning the each vehicle to a plurality of candidate destinations; sampling one of the plurality of candidate destinations with a probability proportional to a repositioning value corresponding to the one candidate destination; and repositioning the each vehicle to the one sampled candidate destination.

According to some embodiments, the present disclosure provides a system comprising one or more processors and one or more non-transitory computer-readable memories coupled to the one or more processors and configured with instructions executable by the one or more processors to cause the system to perform operations comprising: obtaining an offline state value network for predicting a value of a vehicle state, the offline state value network being trained based on a plurality of historical vehicle trajectories; initializing an online state value network and dispatching a plurality of vehicles according to the online state value network for a period of time; training the online state value network based on vehicle states of the plurality of vehicles before and after the dispatching and rewards associated with the dispatching; ensembling the trained online state value network and the offline state value network to obtain an ensembled online state value network; and dispatching the plurality of vehicles according to the ensembled online state value network, e.g., for a next period time.

According to some embodiments, the present disclosure provides one or more non-transitory computer-readable storage media, which stores instructions executable by one or more processors, wherein execution of the instructions causes the one or more processors to perform operations comprising: obtaining an offline state value network for predicting a value of a vehicle state, the offline state value network being trained based on a plurality of historical vehicle trajectories; initializing an online state value network and dispatching a plurality of vehicles according to the online state value network for a period of time; training the online state value network based on vehicle states of the plurality of vehicles before and after the dispatching and rewards associated with the dispatching; ensembling the trained online state value network and the offline state value network to obtain an ensembled online state value network; and dispatching the plurality of vehicles according to the ensembled online state value network, e.g., for a next period time.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the specification. It is to be understood that the foregoing general description and the following detailed description are exemplary and explanatory only, and are not restrictive of the specification, as claimed.

BRIEF DESCRIPTION OF THE DRAWINGS

Non-limiting embodiments of the specification may be more readily understood by referring to the accompanying drawings in which:

FIG. 4A illustrates an exemplary method for vehicle dispatching in a ride-hailing platform, in accordance with various embodiments.

DETAILED DESCRIPTION

Figure 1A:
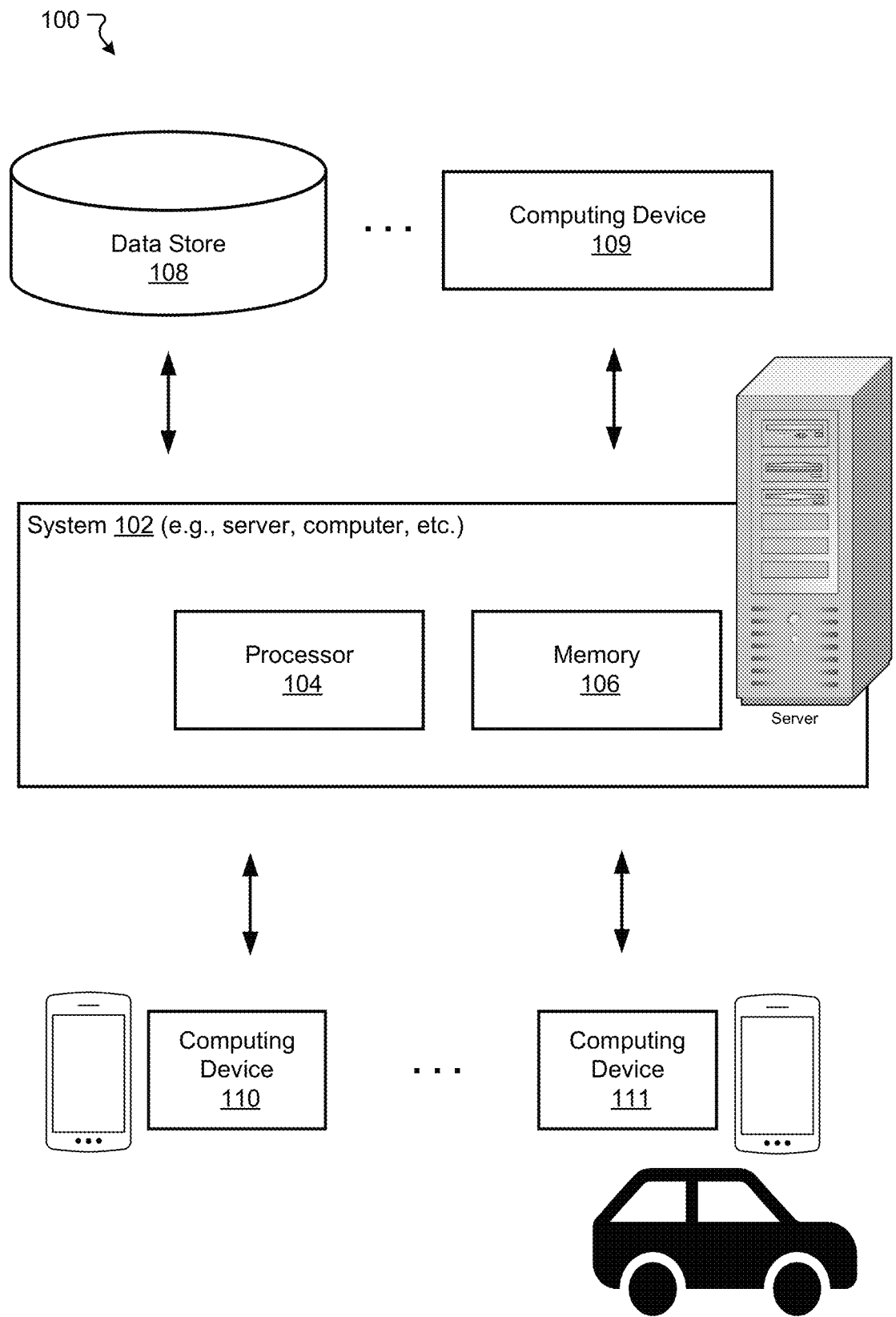
FIG. 1A illustrates an exemplary system for vehicle dispatching, in accordance with various embodiments of the disclosure.

Non-limiting embodiments of the present specification will now be described with reference to the drawings. Particular features and aspects of any embodiment disclosed herein may be used and/or combined with particular features and aspects of any other embodiment disclosed herein. Such embodiments are by way of example and are merely illustrative of a small number of embodiments within the scope of the present specification. Various changes and modifications obvious to one skilled in the art to which the present specification pertains are deemed to be within the spirit, scope, and contemplation of the present specification as further defined in the appended claims.

To at least address the issues discussed in the background section, the disclosure describes an online state value learning method that trains and updates a state value network (e.g., a neural network) directly during online vehicle dispatching (e.g., ride order dispatching and vehicle repositioning) using real-time transactions between vehicles and orders. The online state value learning method is a foundation to build a unified real-time vehicle dispatching framework for joint optimization of both ride order dispatching and vehicle repositioning. By training and updating the state value network in real-time and sharing it for both ride order dispatching and vehicle repositioning, the described method implicitly drives effective coordination among vehicles such as it maintains high performance at a system level even with a massive number of vehicles in a fleet.

For simplicity and consistency, the term "driver" and "vehicle" in this disclosure are used interchangeably. In certain cases involving self-driving vehicles that do not have drivers, the "vehicle" or "driver" means the self-operating vehicle without a driver.

In the following description, activities of each vehicle are modeled as a semi-Markov decision process (SMDP) with a set of temporally extended actions denoted as options. At decision point t, a vehicle i may take an option $o_t^i$, transitioning from a current state $s_t^i$ to the next state $s_{t'}^i$, at time step t' while receiving a numerical reward $r_t^i$. The available options to take at each state may be either a ride order dispatching or an idle vehicle reposition, which may be compactly represented as a tuple including the destination state and the reward, e.g., $(s_{t'}^i, r_t^i)$, and the duration of the transition is given by t'−t. The reward may be equal to the trip fee if the option is an order dispatching or zero if the option is an idle vehicle reposition. For clarification, the embodiments described herein assume that a vehicle enters a ride-hailing platform and starts taking order quests at the start of the day t=0, and finishes the day, or an episode for vehicle dispatching, at the terminal time step t=T. Throughout the episode at each dispatching point (e.g., every 5 seconds), a vehicle dispatching strategy $\pi(o_t|s_t)$, also denoted as $\pi_t$, specifies the probability of taking option $o_t$ for a given state $s_t$.

FIG. 1A illustrates an exemplary system 100 for ride order dispatching and vehicle repositioning, in accordance with various embodiments. The operations shown in FIG. 1A and presented below are intended to be illustrative. As shown in FIG. 1A, the exemplary system 100 may comprise at least one computing system 102 that includes one or more processors 104 and one or more memories 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phones, tablets, servers, computers, wearable devices (smartwatches), etc. The system 102 above may be installed with appropriate software (e.g., platform program, etc.) and/or hardware (e.g., wires, wireless connections, etc.) to access other devices of the system 100.

The system 100 may include one or more data stores (e.g., a data store 108) and one or more computing devices (e.g., a computing device 109) that are accessible to the system 102. In some embodiments, the system 102 may be configured to obtain data (e.g., training data such as location, time, and fees for multiple historical vehicle transportation trips) from the data store 108 (e.g., a database or dataset of historical transportation trips) and/or the computing device 109 (e.g., a computer, a server, or a mobile phone used by a driver or passenger that captures transportation trip information such as time, location, and fees). The system 102 may use the obtained data to train a model for dispatching shared rides through a ride-hailing platform. The location may be transmitted in the form of GPS (Global Positioning System) coordinates or other types of positioning signals. For example, a computing device with GPS capability and installed on or otherwise disposed in a vehicle may transmit such location signal to another computing device (e.g., a computing device of the system 102).

The system 100 may further include one or more computing devices (e.g., computing devices 110 and 111) coupled to the system 102. The computing devices 110 and 111 may comprise devices such as cellphones, tablets, in-vehicle computers, wearable devices (smartwatches), etc. The computing devices 110 and 111 may transmit or receive data to or from the system 102.

In some embodiments, the system 102 may implement an online information or service platform. The service may be associated with vehicles (e.g., cars, bikes, boats, airplanes, etc.), and the platform may be referred to as a vehicle platform (alternatively as service hailing, ride-hailing, or ride order dispatching platform). The platform may accept requests for transportation, identify vehicles to fulfill the requests, arrange for passenger pick-ups, and process transactions. For example, a user may use the computing device 110 (e.g., a mobile phone installed with a software application associated with the platform) to request a transportation trip arranged by the platform. The system 102 may receive the request and relay it to various vehicle drivers (e.g., by posting the request to a software application installed on mobile phones carried by the drivers). Each vehicle driver may use the computing device 111 (e.g., another mobile phone installed with the application associated with the platform) to accept the posted transportation request, obtain pick-up location information, and receive repositioning instructions. Fees (e.g., transportation fees) can be transacted among the system 102 and the computing devices 110 and 111 to collect trip payment and disburse driver income. Some platform data may be stored in the memory 106 or retrievable from the data store 108 and/or the computing devices 109, 110, and 111. For example, for each trip, the location of the origin and destination (e.g., transmitted by the computing device 110), the fee, and the time can be obtained by the system 102.

The system 100 may include one or more data stores (e.g., a data store 108) and one or more computing devices (e.g., a computing device 109) that are accessible to the system 102. In some embodiments, the system 102 may be configured to obtain data (e.g., training data such as location, time, and fees for multiple historical vehicle transportation trips) from the data store 108 (e.g., a database or dataset of historical transportation trips) and/or the computing device 109 (e.g., a computer, a server, or a mobile phone used by a driver or passenger that captures transportation trip information such as time, location, and fees). The system 102 may use the obtained data to train the algorithm for ride order dispatching and vehicle repositioning. The location may comprise GPS (Global Positioning System) coordinates of a vehicle.

In some embodiments, the system 102 and the one or more of the computing devices (e.g., the computing device 109) may be integrated into a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet) through which data can be communicated.

Figure 1B:
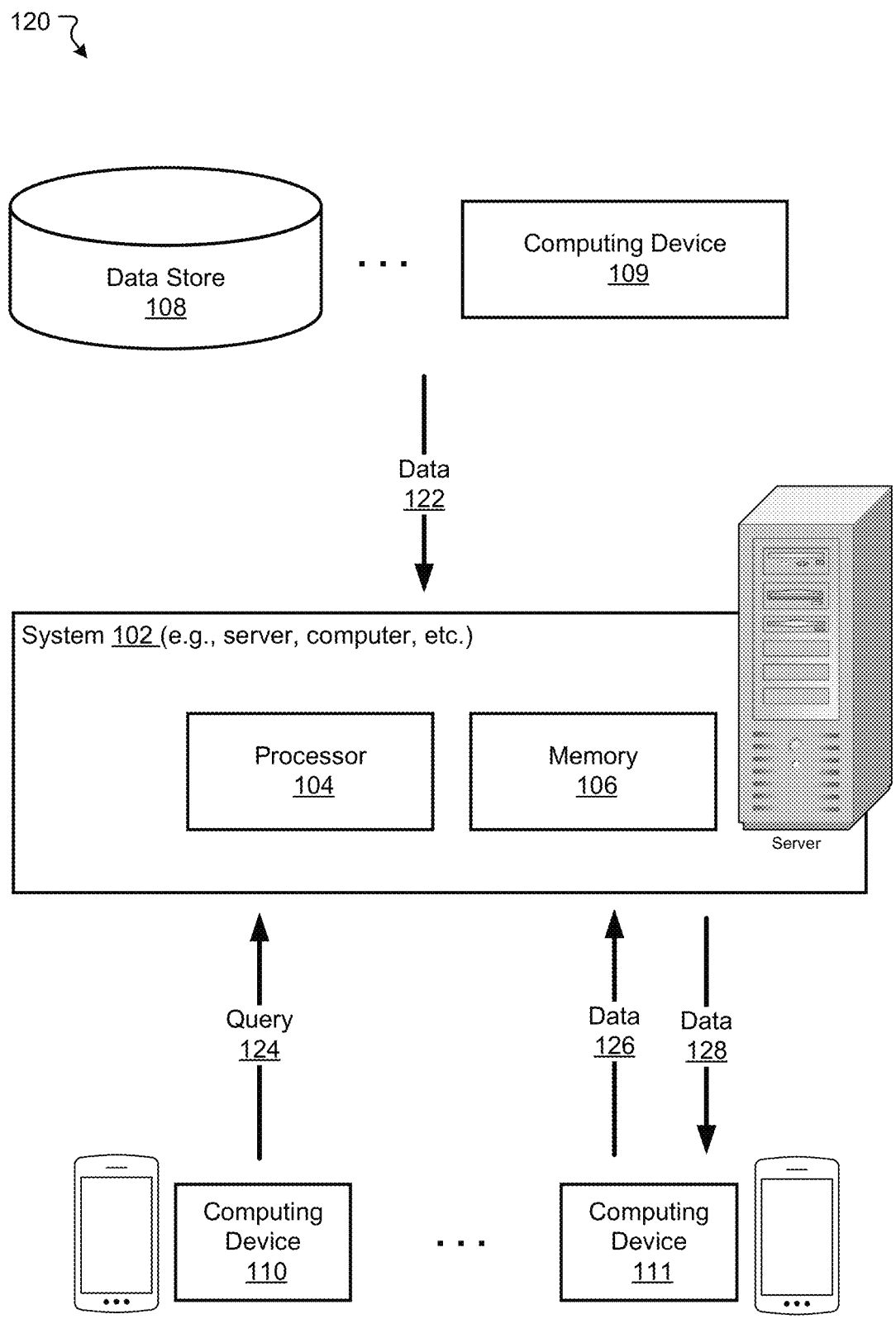
FIG. 1B illustrates an exemplary system for vehicle dispatching, in accordance with various embodiments of the disclosure.

FIG. 1B illustrates an exemplary system 120 for ride order dispatching and vehicle repositioning, in accordance with various embodiments. The operations shown in FIG. 1B and presented below are intended to be illustrative. In various embodiments, the system 102 may obtain data 122 (e.g., training data such as historical data) from the data store 108 and/or the computing device 109. The historical data may comprise, for example, historical vehicle trajectories and corresponding trip data such as time, origin, destination, fee, etc. The obtained data 122 may be stored in the memory 106. The system 102 may learn or extract various information from the historical data, such as supply-demand of an area and its neighboring areas, short-term and long-term rewards for repositioning one or more vehicles (also called observed rewards), etc. The system 102 may train a model with the obtained data 122.

In some embodiments, the computing device 110 may transmit a query 124 to the system 102. The computing device 110 may be associated with a passenger seeking a carpool transportation ride. The query 124 may comprise information such as current date and time, trip information (e.g., origin, destination, fees), etc. In the meanwhile, the system 102 may have been collecting data 126 from a plurality of computing devices such as the computing device 111. The computing device 111 may be associated with a driver of a vehicle described herein (e.g., taxi, a service-hailing vehicle). The data 126 may comprise information such as a current location of the vehicle, a current time, an on-going trip (origin, destination, time, fees) associated with the vehicle, etc. The driver fee is an income to the driver and a cost to the ride-hailing platform. The driver fee may be estimated or determined based on a travel distance or travel time for performing a transportation order. The on-going trip may refer to (1) an order for which the vehicle has picked up passenger(s) but has not delivered the passenger(s) to their destinations, and/or (2) an order for which the vehicle has been assigned a transportation trip but has not picked up the passenger(s) of this transportation trip. The vehicle may have one or more on-going trips and may be selected for pooling more transportation trips if there is at least one vacant seat. For example, a vehicle having four-passenger seats has one passenger of a first transportation order onboard and is on its way to pick up another passenger of a second transportation order. This vehicle may be further assigned a third transportation order to pool one more passenger.

In some embodiments, when making the assignment, the system 102 may send data 128 to the computing device 111 or one or more other devices. The data 128 may comprise an instruction or recommendation for an action, such as re-positioning to another location, accepting a new order (including, for example, origin, destination, fee), etc. In one embodiment, the vehicle may be autonomous, and the data 128 may be sent to an in-vehicle computer, causing the in-vehicle computer to send instructions to various components (e.g., motor, steering component) of the vehicle to proceed to a location to pick up a passenger for the assigned transportation trip.

Figure 2:
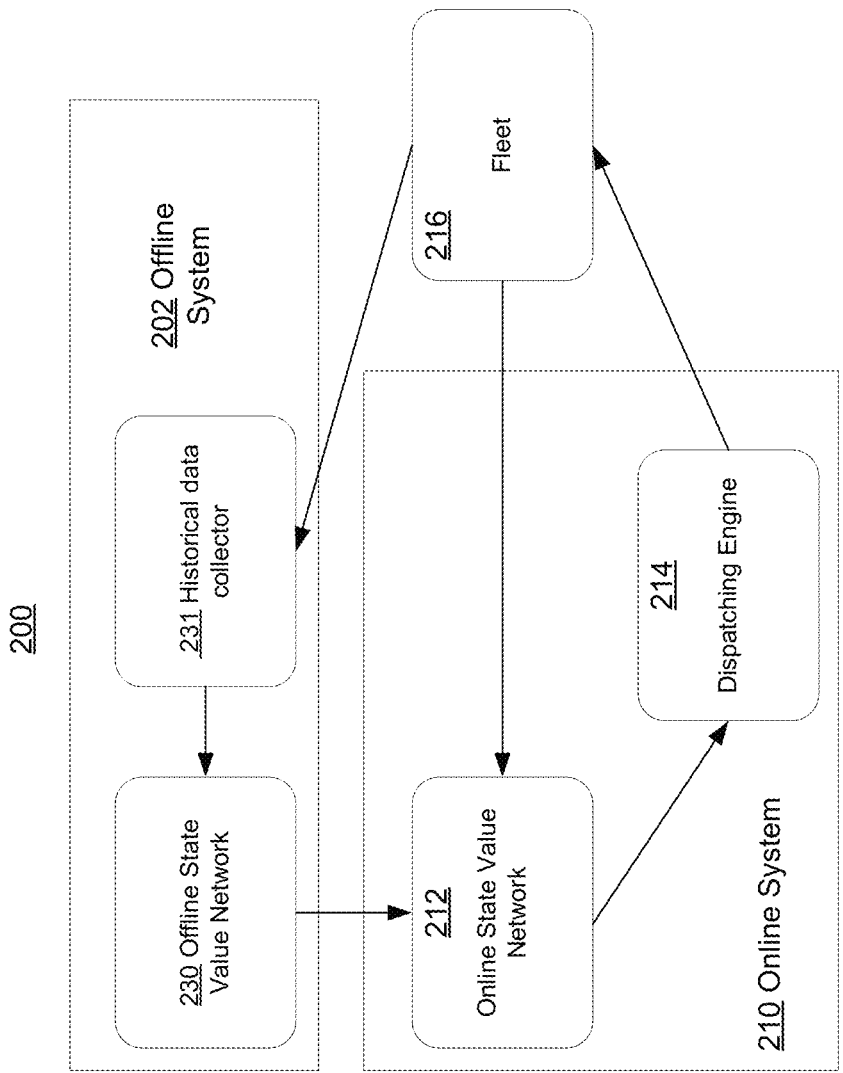
FIG. 2 illustrates an exemplary diagram of a self-learning online vehicle dispatching system, in accordance with various embodiments of the disclosure.

FIG. 2 illustrates an exemplary diagram of a self-learning online vehicle dispatching system 200, in accordance with various embodiments of the disclosure. The modules in the diagram of FIG. 2 are for illustrative purposes only. Depending on the implementation, the system 200 may include fewer, more, or alternative modules.

As shown in FIG. 2, the self-learning online vehicle dispatching system 200 comprises an offline system 202 and an online system 210. The offline system 202 and the online system 210 may refer to different subsystems within a ride-hailing platform.

In some embodiments, the online system 210 includes an online state value network 212, and a dispatching engine 214. The online system 210 may be associated with a vehicle fleet 216. The vehicle fleet 216 includes a plurality of vehicles that are either serving ride orders or waiting for dispatching. The online state value network 212 may include an online-trained neural network that predicts a state value for a given vehicle state. Here, the "vehicle state" may include various information, such as temporal information and spatial information of the vehicle (e.g., the current time and the current location of the vehicle), features of the vehicle, other contextual features (e.g., weather, event, supply-demand in the neighboring area), or any combination thereof. The online state value network 212 may be used for determining vehicle dispatching for the vehicles in the vehicle fleet 216, and be trained in real-time based on the state transitions caused by the vehicle dispatching.

In some embodiments, the online system 210 may initialize the online state value network 212 and dispatch a plurality of vehicles using the dispatching engine 214. The dispatching engine 214 may be configured to make vehicle dispatching decisions according to the online state value network 212. As described above, the vehicle dispatching decisions may include order dispatching decisions (also called order assignment) and/or vehicle repositioning decisions. In some embodiments, the dispatching engine 214 may include different sub-engines to serve order dispatching and vehicle repositioning. Each sub-engine may construct its objective function defining one or more metrics to be maximized (e.g., a cumulative reward) or minimized (e.g., a waiting time) as a result of the corresponding dispatching decisions. The values of the metrics may be determined by the online state value network 212.

In some embodiments, the offline system 202 may be configured to train or otherwise obtain, e.g., from another entity, an offline state value network 230 for predicting a value of a vehicle state. The offline state value network may be trained based on a plurality of historical vehicle trajectories. As shown in FIG. 2, the offline system 202 may include a historical data collector 231 and the offline state value network 230 (e.g., a neural network) trained based on historical data collected by the historical data collector 231. For example, the historical data collector 231 may collect vehicle trajectories for a period of time, each vehicle trajectory includes a series of vehicle state transitions as a result of vehicle dispatching and corresponding rewards. The offline state value network 230 may be trained based on these series of vehicle state transitions to predict rewards for given vehicle states.

One of the unique features of the self-learning online vehicle dispatching system 200 includes periodically updating or reinitializing the online state value network 212 based on the offline state value network 230 during the course of serving the online system 210 (e.g., being used as part of the dispatching engine 214). As pointed out in the background section, a system built solely upon online-learning may lack stability caused by high variances and irregularities in the real-time environment, and a system build solely upon offline-learning may be unable to capture the nonstationary dynamics of the supply-demand conditions in real-time. To address these issues, the self-learning online vehicle dispatching system 200 may adopt a hybrid solution by periodically ensembling the online state value network 212 with the offline state value network 230. For example, the system 200 may periodically ensemble the trained online state value network 212 and the offline state value network 230 to obtain an ensembled online state value network, and dispatch the plurality of vehicles according to the ensembled online state value network for a next period of time. More details of the self-learning online vehicle dispatching system 200 are described below with reference to FIGS. 3A-3D.

Figure 3A:
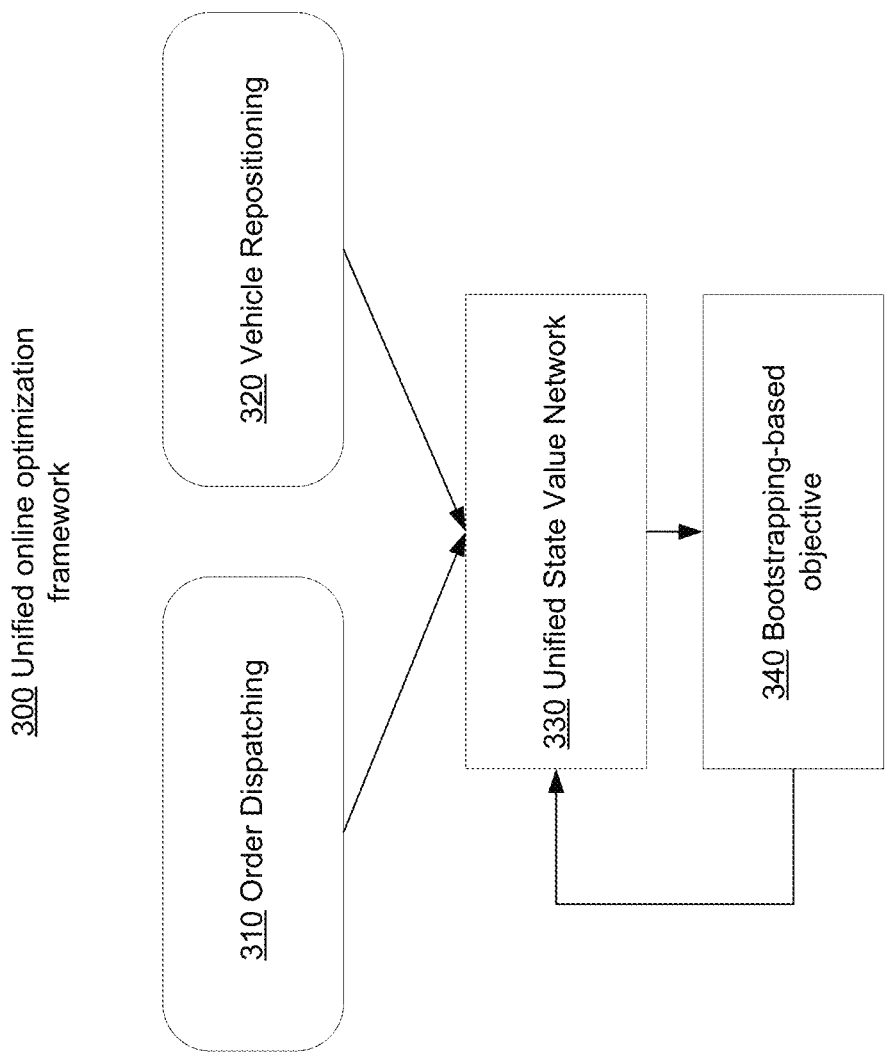
FIG. 3A illustrates an exemplary diagram of a unified online optimization framework, in accordance with various embodiments.

FIG. 3A illustrates an exemplary diagram of a unified online optimization framework 300, in accordance with various embodiments. The structure and data flow shown in FIG. 3A are intended to be illustrative and may be configured differently depending on the implementation.

The unified online optimization framework 300 in FIG. 3A corresponds to the online system 210 in FIG. 2, and shows an exemplary flow of training and applying a unified state value network 330 for online decision-making in a ride-hailing platform. This unified state value network 330 is designed to capture the nonstationary dynamics of the supply-demand conditions in real-time. Based on the unified state value network 330, a unified optimization framework may be constructed for making decisions for order dispatching 310 and online vehicle repositioning 320.

In some embodiments, the state value network 330 may be trained online based on vehicle states of the plurality of vehicles observed before and after the dispatching and rewards associated with the dispatching. For example, the training process may include: for each of the plurality of vehicles: determining a first vehicle state value using the online state value network based on the vehicle state before the dispatching; determining a second vehicle state value using the online state value network based on the vehicle state after the dispatching; determining a temporal difference (TD) error based on the first vehicle state value, the second vehicle state value, and a reward associated with the dispatching; and constructing an objective function based on the plurality of TD errors; and updating parameters of the online state value network using gradient descent to minimize the objective function.

For example, a set of available drivers in a current dispatching window may be denoted as D. After the dispatching window, the drivers may execute different options based on the dispatching decisions, and the unified state value network 330 may be updated accordingly by accounting for each driver's state transition. For example, let $D_D$ represent some of the available drivers D that receive order dispatching instructions (e.g., serving ride orders), and let $D_I := D \backslash D_D$ represent idle vehicles that have not been assigned with ride orders in the current dispatching window (also called dispatching round). For each driver $i \in D_D$, let $s_{driver}^i$ and $s_{order}^i$ the current driver state and the order destination state, respectively. Here, the "order destination state" may include the driver state after serving the assigned ride order at the destination location.

In some embodiments, with the above denotations, a one-step Bellman update for the transition of driver i may be given by formula (1):

$$V(s_{driver}^i) := r_{order}^i + \gamma^{\Delta t_{order}} V(s_{order}^i) \qquad (1)$$

where γ refers to a discount factor, $r_{order}^i$ is the corresponding order trip fee (reward), and $\Delta t_{order}$ is the estimated order trip length (distance and/or duration). Similarly, for each driver $i \in D_I$, let $s_{idle}^i$ denote the next state after idle movement from the current state $s_{vehicle}^i$. The Bellman update for this idle transition may be given by formula (2):

$$(s_{driver}^i) := 0 + \gamma^{\Delta t_{idle}} V(s_{idle}^i) \qquad (2)$$

where the transition yields 0 reward and lasts for $\Delta t_{idle}$ in duration.

In order to construct and train the unified state value network 330, the above two Bellman updates may be jointly converted into a bootstrapping-based objective 340. This objective 340 may also be known as mean-squared temporal difference (TD) error associated with the unified state value network 330. In some embodiments, the unified state value network 330, denoted as a V-network, $V_\theta$, may be trained via gradient descent. For example, using $\delta_\theta^i$ to represent the TD error for the $i_{th}$ driver, it may be defined in formula (3):

$$\delta_\theta^i = \begin{cases} r_{order}^j + \gamma^{\Delta t_{order}} V_\theta(s_{order}^i) - V_\theta(s_{driver}^i) & \forall i \in \mathcal{D}_D; \\ \gamma^{\Delta t_{idle}} V_\theta(s_{idle}^i) - V_\theta(s_{driver}^j) & \forall i \in \mathcal{D}_I. \end{cases} \qquad (3)$$

where γ refers to a discount factor, $r_{order}^i$ is the corresponding order trip fee (reward), $\Delta t_{order}$ is the estimated order trip length (distance and/or duration), $D_D$ represents some of the available drivers D that receive order dispatching instructions (e.g., serving ride orders), and $D_I := D \backslash D_D$ represents idle vehicles that have not been assigned with ride orders in the current dispatching window (also called dispatching round).

In some embodiments, the bootstrapping-based objective 340 may be constructed by applying formula (3) to all drivers in D, defined in formula (4):

$$\min_\theta L(\mathcal{D}:\theta) := \sum_{i \in \mathcal{D}_D} \left( V_\theta(s_{driver}^i) - r_{order}^j - \gamma^{\Delta t_{order}} \overline{V}_\theta(s_{order}^i) \right)^2 + \qquad (4)$$
$$\sum_{i \in \mathcal{D}_I} \left( V_\theta(s_{driver}^i) - \gamma^{\Delta t_{idle}} \overline{V}_\theta(s_{order}^i) \right)^2 = \sum_{i \in \mathcal{D}} (\delta_\theta^i)^2$$

where $\overline{V}_\theta$ refers to a delayed copy of the V-function $V_\theta$, also called the target network. This target network is designed to keep the training process more stable.

During each round of dispatching, the state of the drivers dispatched to serve orders (e.g., order dispatching 310) and the drivers dispatched to stay idle or reposition (e.g., vehicle repositioning 320) may be fed into the current version of the unified state value network 330 to determine their respective values. These values may then be fed into the bootstrapping-based objective 340 (formula (4)) for optimization. The goal of the optimization may include minimizing the loss function L. For example, after each round of dispatch, $V_\theta$ may be updated by taking a gradient descent step towards minimizing L(θ), e.g., $V_\theta \rightarrow V_\theta - \alpha \nabla L \, \mathcal{D}; \theta$), where α>0 refers to a step-size parameter to control the training rate.

Figure 3B:
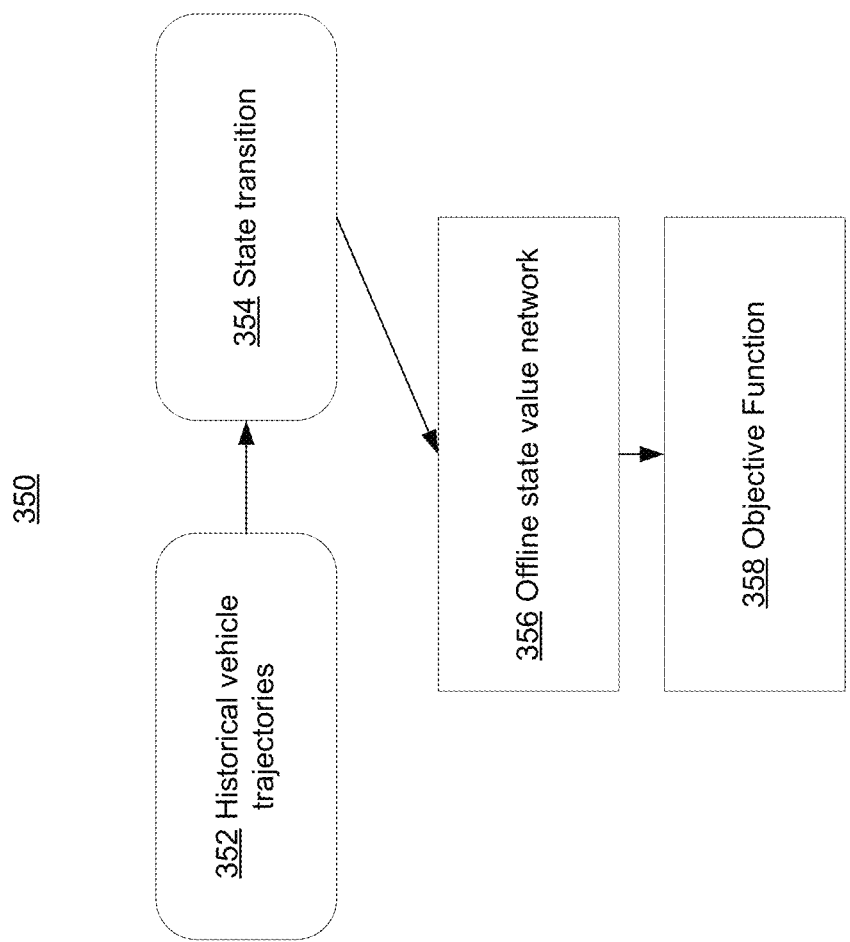
FIG. 3B illustrates an exemplary diagram of an offline state value network, in accordance with various embodiments.

FIG. 3B illustrates an exemplary diagram of an offline state value network 350, in accordance with various embodiments. The structure and data flow of the offline state value network 350 shown in FIG. 3B are intended to be illustrative and may be configured differently depending on the implementation.

The online learning shown in FIG. 3A provides a great way for fast adaptiveness. There are, however, a few limitations for relying solely on online learning without learning from historical data. The mobility-on-demand environment is a time-varying system with multiple shifts of the state distribution and system dynamics throughout the day, e.g., the transition from morning rush hours to off-peak hours around noon. Such non-stationarity can cost an online learning system (sometimes significant) delays in adapting to the new state distribution, hence a loss of performance in the transitioning period. Furthermore, the convergence of RL methods in the online learning process usually hinges on a sufficient coverage of state distribution in the training data. From formula (4), it can be seen that the size of the online training data depends on the number of vehicles and their corresponding states in the system. One can imagine that the learning progress will be slow, and performance deteriorates when operating for example in a large city with a small group of vehicles. To address the above limitations, some embodiments described herein combine the online learning of FIG. 3A with an offline state value network 356 that is trained based on the abundant historical vehicle trajectory data 352.

In some embodiments, training the offline state value network 356 may include: for each vehicle state transition extracted from the plurality of historical vehicle trajectories, determining, using the offline state value network, a first vehicle state value before the each vehicle state transition and a second vehicle state value after the each vehicle state transition, constructing an objective function based on a squared error of the first vehicle state value, the second vehicle state value, and a reward associated with the each vehicle state transition; and updating parameters of the offline state value network to minimize the objective function. In some embodiments, the each vehicle state transition comprises an initial vehicle state, a next vehicle state, and the reward for transitioning from the initial vehicle state to the next vehicle state. The determining the first vehicle state value using the offline state value network may include: inputting the initial vehicle state and a timestamp associated with the initial vehicle state into the offline state value network to determine the first vehicle state value.

As an example, the historical vehicle trajectories 352 in FIG. 3B may include a plurality of vehicle trajectories throughout one dispatching episode (e.g., a day). Each of such trajectories may include a plurality of state transitions 354. Each state transition 354 may correspond to one dispatching decision (either order dispatching or repositioning). Denoting the historical vehicle trajectories 352 as $D_h$, the offline state value network 356 may be trained to predict state values for given vehicle states based on the state transitions 354 as well as the observed rewards associated with these state transitions 354. For example, the offline state value network 356 may be used to construct an objective function 358 of off-policy evaluation (OPE) based on each state transition (s, R, s'), where s and s' refer to the pre-transition state and the post-transition state, respectively, and R refers to a properly discounted reward from the transition. In some embodiments, the objective function 358 may be defined in formula (5):

where $\gamma$ refers to a discount factor, s and s' refer to a pre-transition state and a post-transition state respectively, t and t' refer to a pre-transition timestamp and a post-transition timestamp respectively, R refers to the rewards associated with the transition, $\rho$ refers to trainable weights of the offline state value network 356, $\hat{V}_{ope}$ refers to the target network, and $L_{reg}$ refers to a regularization term. Both $\hat{V}_{ope}$ and $L_{reg}$ are added to induce a smooth and robust value response by minimizing an upper bound on the Lipschitz constant of the neural network $V_{ope}(.|\rho)$.

In some embodiments, different from the structure of the online value function $V_\theta$ in FIG. 3A, the offline value network $V_{ope}(.|\rho)$ is designed to take into account the time-varying aspect of the system. As shown in formula (5), the input state to the offline value network $V_{ope}(.|\rho)$ includes timestamps (e.g., t or t', corresponding to pre-transition time and post-transition time, respectively). This means the trained offline value network $V_{ope}(.|\rho)$ may include a time series of state value functions that may be used as the basis for ensemble with the online value network $V_\theta$.

Figure 3C:
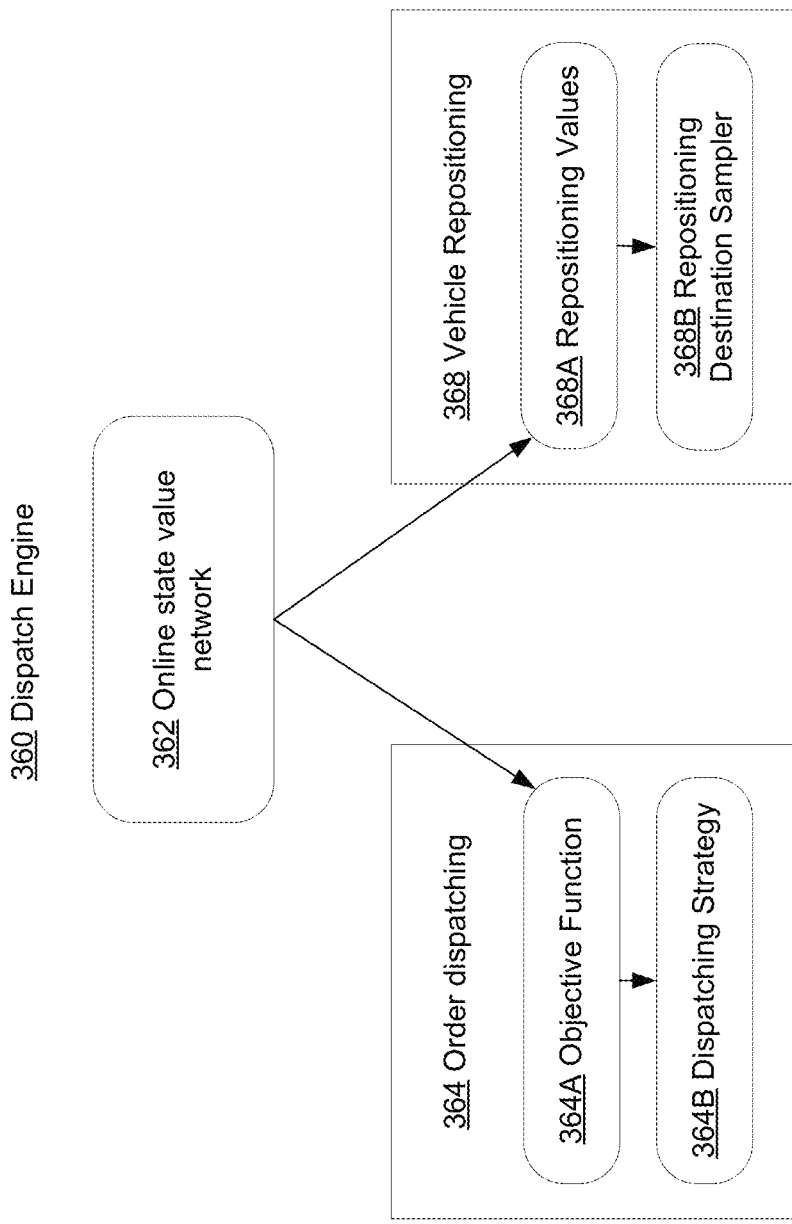
FIG. 3C illustrates an exemplary diagram of a vehicle dispatching engine, in accordance with various embodiments.

FIG. 3C illustrates an exemplary diagram of a vehicle dispatching engine 360, in accordance with various embodiments. The structure and data flow of the vehicle dispatching engine 360 shown in FIG. 3C are intended to be illustrative and may be configured differently depending on the implementation.

As described above, during each dispatching round or window, a plurality of drivers may be either assigned to serve ride orders or instructed to reposition. In some embodiments, the drivers that are in an idle state for a period longer than a predetermined threshold may be allocated in a group for repositioning. The other drivers may be allocated in a group for serving orders. For drivers in either of these two groups, the online state value network 362 may be used as a basis for dispatching.

Order Dispatching Based on the Online State Value Network 362

Order-dispatching subsystem 364 of ride-hailing platforms may be a multi-agent environment with multiple drivers making sequential decisions. The platform keeps assigning passengers to nearby idle drivers within a continuous set of small time intervals. Each ride request cannot be paired with multiple drivers to avoid assignment conflicts.

In some embodiments, the process for determining the order/vehicle pairings may include: for each dispatching pair comprising a pending ride order and one of the one or more vehicles, determining a dispatching value using the online state value network; constructing an objective function comprising a plurality of dispatching values respectively corresponding to a plurality of decision variables; determining the plurality of decision variables that maximizes the objective function; and dispatching the one or more of the plurality of vehicles to serve the one or more pending ride orders according to the plurality of decision variables.

For example, a utility score $\rho_{ij}$ may be determined as a value for matching a driver i and an order j. Accordingly, a global order dispatching strategy 364B in each dispatching round may be determined by solving a bipartite marching problem that maximizes an objective function 364A, which may be defined in formula (7):

$$\min_{\rho} L_{ope}(D_h; \rho) := \left(R + \gamma^{\Delta t} \hat{V}_{ope}(s', t' | \rho) - V_{ope}(s, t | \rho)\right)^2 + \lambda \cdot L_{reg}(\rho) \quad (5)$$

$$\underset{x_{ij}}{\mathrm{argmax}} \sum_{j=0}^{M} \sum_{i=0}^{N} \rho_{ji} x_{ji}, \quad (7)$$

-continued $$\text{s.t.} \sum_{j=0}^{M} x_{ji} \leq 1 \forall i : \sum_{i=0}^{N} x_{ji} \leq 1 \forall j.$$

where:

$$x_{ji} = \begin{cases} 1 & \text{if order } j \text{ is assigned to driver } i; \\ 0 & \text{if order } j \text{ is not assigned to driver } i. \end{cases}$$

In formula (7), the $x_{ji}$ refers to the decision variables, and the utility score $\rho_{ij}$ may be determined based on $6_\theta^i$ in formula (3) as the difference between an expected reward of a driver i accepting order j and that of the driver staying idle. This difference may also be referred to as the advantage of executing the option of picking up the order j compared to the option of idle movement. For each driver, such advantage is different when pairing with different orders. In some embodiments, the utility score $\rho_{ij}$ may be determined by formula (8):

$$\rho_{ij} = \delta^{ij} + \Omega \cdot U_{ij} \tag{8}$$

where:

$$\delta^{ij} = r_{order}^{j} + \gamma^{\Delta t_{order}} V_\theta(s_{destination}^{j}) - V_\theta(s_{driver}^{i})$$

Here $r_{order}^{j}$ denotes the trip fee the driver receives by serving the order j, $\Delta t_{order}$ is the trip duration, $s_{destination}^{j}$ represents the state at the destination of the order j, and $U_{ij}$ characterizes the collection of all terms that optimize the user experience weighted by the parameter $\Omega$, e.g., the objective of minimizing the waiting time for the passenger may be obtained by including negative forms of the driver-passenger distances in $U_{ij}$.

Vehicle Repositioning Based on the Online State Value Network 362

The following description describes an exemplary use of the real-time updated value network $V_\theta$ for vehicle repositioning and large-scale fleet management. Vehicle repositioning, by proactively deploying idle vehicles to a specific location in anticipation of future demand at the destination or beyond, is an important lever to reduce driver idle time and increase the overall efficiency of an MoD system. When the vehicles under management only constitute a small portion of the whole fleet, each vehicle, or agent, can be considered as acting independently of the others. However, the performance of these single-agent systems often deteriorates noticeably as the size of the fleet increases, due to the unresolved competitions among the population of the managed vehicles.

To address the above-identified issues, in some embodiments, the process of selecting reposition destination may include: identifying one or more of the plurality of vehicles with idle time exceeding a time threshold; for each of the one or more identified vehicles, determining a plurality of repositioning values corresponding to repositioning the each vehicle to a plurality of candidate destinations; sampling one of the plurality of candidate destinations with a probability proportional to a repositioning value corresponding to the one candidate destination; and repositioning the each vehicle to the one sampled candidate destination. The sampling method based on probabilities rather than absolute values effectively avoids a large number of idle vehicles from being repositioned to the same destination at the same time (also known as the "overreacting" phenomenon).

For example, for each vehicle i to be repositioned, the vehicle repositioning subsystem 358 may select one destination from a set of candidate destinations $O_d(s^i)$ provided the vehicle/driver's current state $s^i$. The objective of this process may include maximizing an expected long-term return for the driver, e.g., the value of the destination state. In some embodiments, the online state value network 362 may be used as the basis for determining repositioning values 368A for the candidate destinations, and the selected destination may be determined by a repositioning destination sampler 368B based on the repositioning values 368A. In some embodiments, the repositioning destination sampler 368B may sample one destination with probability proportional to the discounted values determined by the online state value network 362, which may be defined in formula (9):

$$p(s_k^i) \sim \frac{e^{\gamma \Delta t_{ik} V_\theta(s_k^i)}}{\sum_{j \in O_d(s^i)} e^{\gamma \Delta t_{ij} V_\theta(s_j^i)}} \cdot \forall k \in O_d(s^i) \tag{9}$$

where $0 < \gamma < 1$ denotes the discount factor and $\Delta t_{ik}$ refers to the estimated travel time to the destination k. In some embodiments, the current location of the vehicle is included in the set of candidate destinations $O_d(s^i)$, and indicates that the vehicle stays at the current location. In that case, the travel time is defined as zero $\Delta t_{kk}=0$ and the state value may not be discounted when computing the sampling probability. That is, the cost of repositioning to a state different from the current is accounted for such that a closer destination with a smaller reposition cost is preferred given the same state value.

Figure 3D:
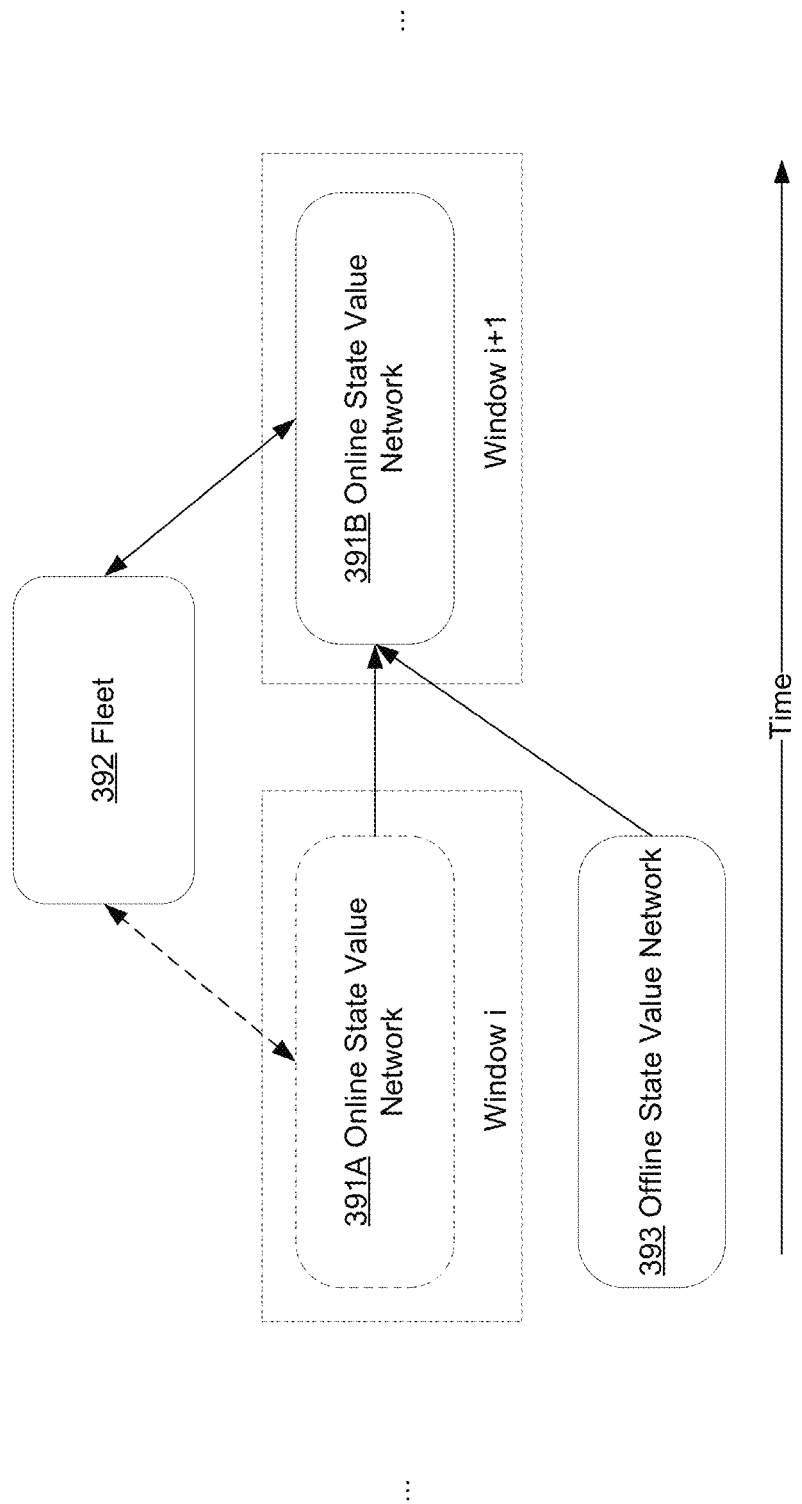
FIG. 3D illustrates an exemplary diagram of ensembling vehicle state value networks, in accordance with various embodiments.

FIG. 3D illustrates an exemplary diagram of ensembling vehicle state value networks, in accordance with various embodiments. The structure and data flow of the ensembling process shown in FIG. 3D are intended to be illustrative and may be configured differently depending on the implementation.

The online state value network 391A at a current dispatch window i may be used to determine the dispatching decisions for vehicles in the fleet 392 and self-trained based on the observed state transitions caused by the dispatching decisions in the fleet 392. In some embodiments, after one or more dispatch windows, the online state value network 391A may be ensembled with an offline state value network 393 to generate a new version of the online state value network 391B for serving the dispatching in the next dispatch window. The new version of the online state value network 391B may be referred to as an ensembled online state value network. In some embodiments, the ensembling may involve a weighted sum of the online state value network 391A and the offline state value network 393.

As described above, in some embodiments, the offline state value network 393 may comprise a series of state value functions corresponding to a series of time points for an episode of vehicle dispatching. This may be a result of augmenting the inputs of the offline state value network 393 to include timestamps of state transitions. In this case, the ensembling the trained online state value network 391A and the offline state value network 393 may include ensembling the trained online state value network 391A at a current time with one of the series of state value functions corresponding to the current time point. For example, an online state value network 391A trained at 10 AM may be ensembled with the offline-trained state value function trained based on state transitions with 10 AM time stamps.

In some embodiments, an episode of vehicle dispatching comprises a plurality of dispatch rounds, the training of the online state value network 391A and/or 391B is performed after every first predetermined number of dispatch rounds, and the ensembling of the trained online state value network 391A and/or 391B and the offline state value network 393 is performed after every second predetermined number of dispatch rounds, the second predetermined number being greater than the first predetermined number.

As shown in FIG. 3D, the online state value network 391A and 391B are evolving from one dispatching window to another. This evolution includes not only the self-training using the online data, but also include periodically ensembling with the offline state value network. In comparison to the online state value network 391A and 391B, the offline state value network 393 may be relatively static, and updated in a much lower frequency. For example, the offline state value network 393 may be re-trained or updated based on observed data collected from the most recent period of time (e.g., a week or month), while the online state value network 391A and 391B may be self-trained in real-time and ensembled with the offline network 393 once after every plurality of dispatching windows during each dispatching episode.

FIG. 4A illustrates an exemplary method 400 for vehicle dispatching in a ride-hailing platform, in accordance with various embodiments. The steps of method 400 shown in FIG. 4A are for illustrative purposes and may be configured in various ways depending on the implementation.

In some embodiments, the method 400 may start with initializing an online state network. The initialization may be performed in various ways, such as using random weights, determining the weights based on historical data, coping the offline state value network $V_{ope}$, or another suitable way. For example, at the beginning of each episode (e.g., a day, a week, or a month), the online state value network V may be initialized with random weights θ (e.g., line 4 of method 400), denoted as $V_θ$, an ensemble weight 1>ω>0 and a reposition threshold C>0 may be configured. Here, the ensemble weight may be used for ensembling the online state value network $V_θ$ and the offline state value network $V_{ope}$ (e.g., at line 7 of method 400). The "reposition threshold" may be used to determine which drivers/vehicles should receive repositioning instructions rather than order dispatching (e.g., lines 10-14 of method 400). In some embodiments, the offline state value network $V_{ope}$ may be pre-trained using historical trajectories based on formula (5) with state inputs augmented by timestamps (e.g., line 2 of method 400).

In some embodiments, the ensembling of the online state value network $V_θ$ and the offline state value network $V_{ope}$ may include: determining, within an episode of vehicle dispatching, a plurality of time points for ensembling; determining whether a current time point is one of the plurality of time points; and in response to the current time point being one of the plurality of time points, performing the ensembling of the trained online state value network and the offline state value network. As shown in line 3 of method 400, a set ε of changing time points for ensembling may be determined beforehand. This set of changing time points defines when an ensembling should be performed.

Starting from line 5, the method 400 shown in FIG. 4A describes steps for vehicle dispatching with online-training and ensembling. In some embodiments, a dispatching episode may include a plurality of dispatch round (e.g., line 5 of method 400). During each dispatch round, the online state value network is ensembled with the offline state value network if the current dispatch round is one of the set ε of changing time points for ensembling.

Subsequently, based on the online state value network, the order dispatching problem defined in formula (7) may be solved to determine order assignments. For drivers/vehicles that have been idle for at least C time steps, reposition instructions may be determined based on the online state value network and the destination value distribution defined in formula (9). In some embodiments, the repositioning of one or more vehicles is performed at a lower frequency (e.g., only performed after a vehicle is idle for a certain number of time steps) than the dispatching of one or more vehicles to serve the one or more pending ride orders (e.g., during each round of dispatching).

At the end of the current dispatch round, the driver/vehicle transitions are collected to train the online state value network using gradient descent (e.g., lines 15-17 of method 400).

Figure 4B:
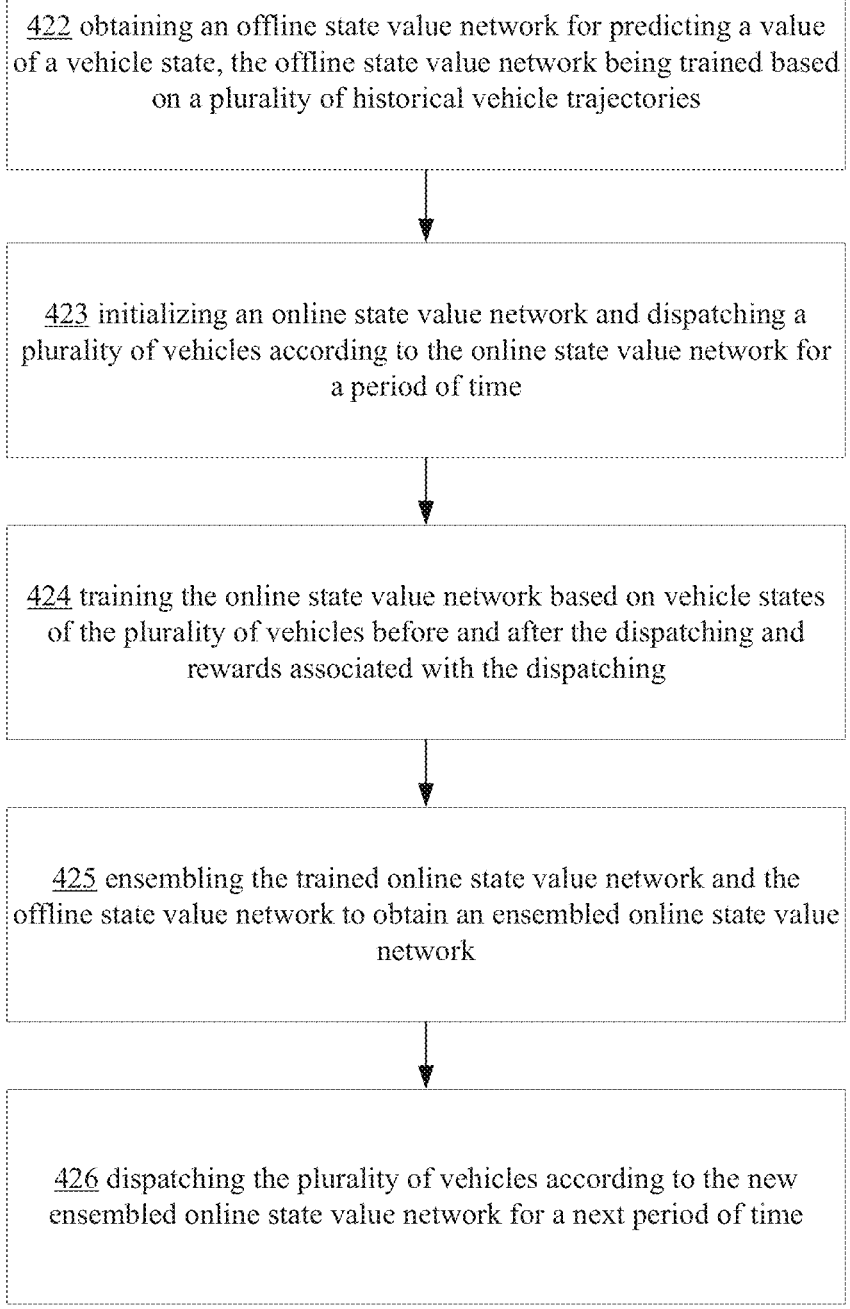
FIG. 4B illustrates another exemplary method for vehicle dispatching in a ride-hailing platform, in accordance with various embodiments.

FIG. 4B illustrates another exemplary method 420 for vehicle dispatching in a ride-hailing platform, in accordance with various embodiments. The method 420 may be implemented in various environments including, for example, by the system 100 of FIG. 1A and FIG. 1B. The exemplary method 420 may be implemented by one or more components of the system 102 (e.g., the one or more computing devices such as servers). For example, a non-transitory computer-readable storage medium (e.g., the memory 106) may store instructions that, when executed by a processor (e.g., the processor 104), cause the system 102 (e.g., the processor 104) to perform the method 420. The operations of method 420 presented below are intended to be illustrative. Depending on the implementation, the exemplary method 420 may include additional, fewer, or alternative steps performed in various orders or in parallel.

Block 422 includes obtaining an offline state value network for predicting a value of a vehicle state, the offline state value network being trained based on a plurality of historical vehicle trajectories. In some embodiments, the offline state value network comprises a series of state value functions corresponding to a series of time points.

Block 423 includes initializing an online state value network and dispatching a plurality of vehicles according to the online state value network for a period of time.

Block 424 includes training the online state value network based on rewards associated with the dispatching and vehicle states of the plurality of vehicles before and after the dispatching. In some embodiments, the training the online state value network based on vehicle states of the plurality of vehicles before and after the dispatching and rewards associated with the dispatching comprises: for each of the plurality of vehicles: determining a first vehicle state value using the online state value network based on the vehicle state before the dispatching; determining a second vehicle state value using the online state value network based on the vehicle state after the dispatching; determining a temporal difference (TD) error based on the first vehicle state value, the second vehicle state value, and a reward associated with the dispatching; and constructing an objective function based on the plurality of TD errors; and updating parameters of the online state value network using gradient descent to minimize the objective function.

Block 425 includes ensembling the trained online state value network and the offline state value network to obtain an ensembled online state value network. In some embodiments, the ensembling of the trained online state value network and the offline state value network includes ensembling the trained online state value network and one of the series of state value functions corresponding to a current time point. In some embodiments, an episode of vehicle dispatching comprises a plurality of dispatch rounds, the training of the online state value network is performed after every first predetermined number of dispatch rounds, and the ensembling of the trained online state value network and the offline state value network is performed after every second predetermined number of dispatch rounds, the second predetermined number being greater than the first predetermined number.

Block 426 includes dispatching the plurality of vehicles according to the ensembled online state value network for a next period time. In some embodiments, the dispatching of the plurality of vehicles comprises: dispatching one or more of the plurality of vehicles to serve one or more pending ride orders and/or repositioning one or more of the plurality of vehicles. In some embodiments, the repositioning of one or more vehicles is performed at a lower frequency than the dispatching of one or more vehicles to serve the one or more pending ride orders. In some embodiments, the dispatching the one or more of the plurality of vehicles to serve the one or more pending ride orders comprises: for each dispatching pair comprising a pending ride order and one of the one or more vehicles, determining a dispatching value using the online state value network; constructing an objective function comprising a plurality of dispatching values respectively corresponding to a plurality of decision variables; determining the plurality of decision variables that maximizes the objective function; and dispatching the one or more of the plurality of vehicles to serve the one or more pending ride orders according to the plurality of decision variables. In some embodiments, the repositioning the one or more of the plurality of vehicles comprises: identifying one or more of the plurality of vehicles with idle time exceeding a time threshold; for each of the one or more identified vehicles, determining a plurality of repositioning values corresponding to repositioning the each vehicle to a plurality of candidate destinations; sampling one of the plurality of candidate destinations with a probability proportional to a repositioning value corresponding to the one candidate destination; and repositioning the each vehicle to the one sampled candidate destination.

In some embodiments, the method 420 may further include training the offline state value network. The training may comprise: for each vehicle state transition extracted from the plurality of historical vehicle trajectories, determining, using the offline state value network, a first vehicle state value before the each vehicle state transition and a second vehicle state value after the each vehicle state transition, constructing an objective function based on a squared error of the first vehicle state value, the second vehicle state value, and a reward associated with the each vehicle state transition; and updating parameters of the offline state value network to minimize the objective function. In some embodiments, the each vehicle state transition comprises an initial vehicle state, a next vehicle state, and the reward for transitioning from the initial vehicle state to the next vehicle state. In some embodiments, the determining the first vehicle state value using the offline state value network comprises: inputting the initial vehicle state and a timestamp associated with the initial vehicle state into the offline state value network to determine the first vehicle state value.

In some embodiments, the method 420 may further include determining, within an episode of vehicle dispatching, a plurality of time points for ensembling; and the ensembling the trained online state value network and the offline state value network comprises: determining whether a current time point is one of the plurality of time points; and in response to the current time point being one of the plurality of time points, performing the ensembling of the trained online state value network and the offline state value network.

Figure 5:
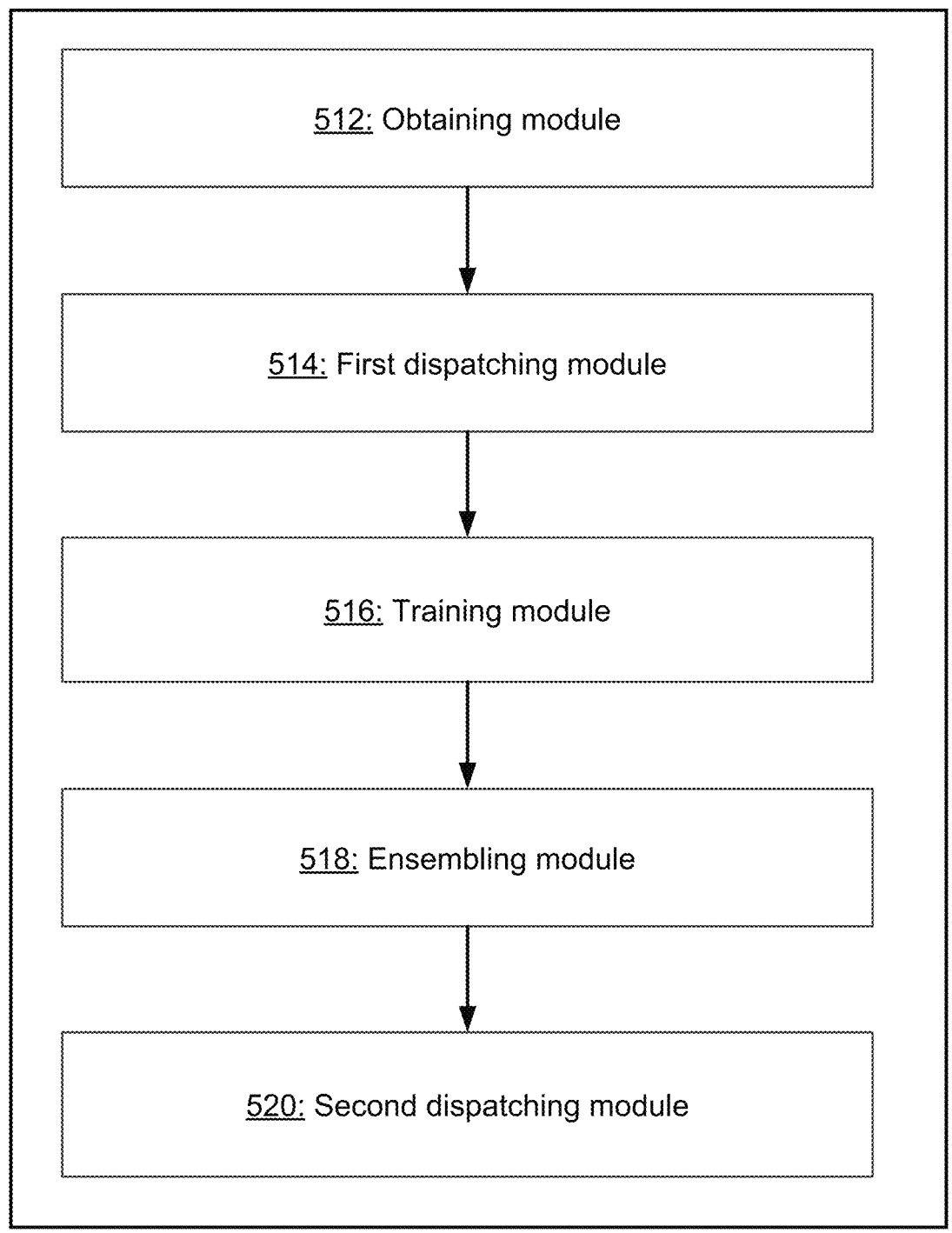
FIG. 5 illustrates an exemplary system for repositioning vehicles in a ride-hailing platform, in accordance with various embodiments.

FIG. 5 illustrates a block diagram of an online learning vehicle dispatching system 500, in accordance with various embodiments. The system 500 may be an exemplary implementation of the system 102 of FIG. 1A and FIG. 1B or one or more similar devices. The methods in FIG. 4A and 4B may be implemented by the computer system 500. The computer system 500 may include one or more processors and one or more non-transitory computer-readable storage media (e.g., one or more memories) coupled to the one or more processors and configured with instructions executable by the one or more processors to cause the system or device (e.g., the processor) to perform the methods in FIG. 4A and 4B. The computer system 500 may include various units/modules corresponding to the instructions (e.g., software instructions).

In some embodiments, the computer system 500 may include an obtaining module 512, a first dispatching module 514, a training module 516, an ensembling module 518, and a second dispatching module 520. Depending on the implementation, the first dispatching module 514 and the second dispatching module 520 may respectively refer to a same online decision making system for the ride-hailing platform at different point of time using different value neural networks.

In some embodiments, the obtaining module 512 may be configured to obtain an offline state value network for predicting a value of a vehicle state, the offline state value network being trained based on a plurality of historical vehicle trajectories. The first dispatching module 514 may be configured to initialize an online state value network and dispatching a plurality of vehicles according to the online state value network for a period of time. The training module 516 may be configured to train the online state value network based on vehicle states of the plurality of vehicles before and after the dispatching and rewards associated with the dispatching. The ensembling module 518 may be configured to ensemble the trained online state value network and the offline state value network to obtain an ensembled online state value network. The second dispatching module 520 may be configured to dispatch the plurality of vehicles according to the ensembled online state value network, e.g., for a next period time.

Figure 6:
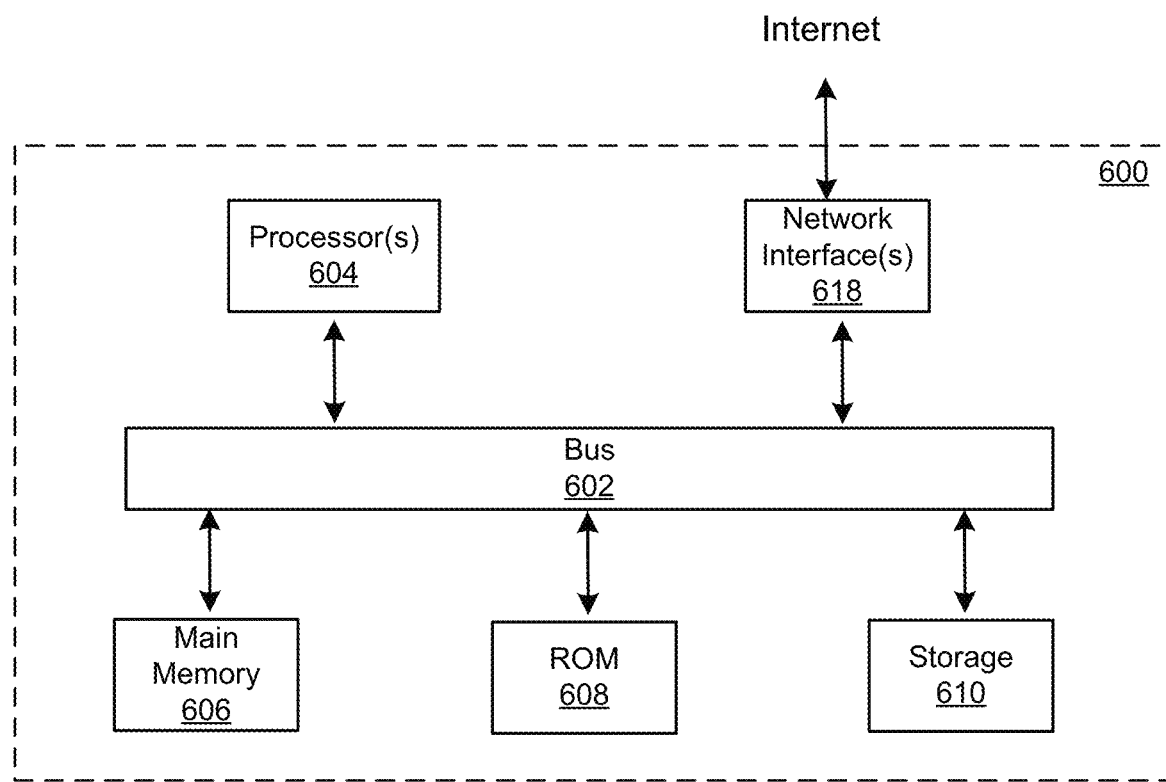
FIG. 6 illustrates a block diagram of an exemplary computer system in which any of the embodiments described herein may be implemented.

FIG. 6 is a block diagram that illustrates a computer system 600 upon which any of the embodiments described herein may be implemented. The system 600 may correspond to the system 190 or the computing device 109, 110, or 111 described above. The computer system 600 includes a bus 602 or another communication mechanism for communicating information, one or more hardware processors 604 coupled with bus 602 for processing information. Hardware processor(s) 604 may be, for example, one or more general-purpose microprocessors.

The computer system 600 also includes a main memory 606, such as a random access memory (RAM), cache, and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The computer system 600 further includes a read-only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may implement the techniques described herein using customized hard-wired logic, one or more ASICs or FPGAs, firmware, and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The main memory 606, the ROM 608, and/or the storage 610 may include non-transitory storage media. The term "non-transitory media," and similar terms, as used herein refers to a media that store data and/or instructions that cause a machine to operate in a specific fashion. The media excludes transitory signals. Such non-transitory media may include non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge, and networked versions of the same.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic, or optical signals that carry digital data streams representing various types of information.

The computer system 600 can send messages and receive data, including program code, through the network(s), network link, and network interface 618. In the Internet example, a server might transmit a requested code for an application program through the Internet, the ISP, the local network, and the network interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors including computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be included in program codes or instructions stored in a memory (e.g., a non-transitory computer-readable storage medium described above). Such algorithm may include a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
    obtaining an offline state value network for predicting a value of a vehicle state, the offline state value network being trained based on a plurality of historical vehicle trajectories wherein the plurality of historical vehicle trajectories comprises a plurality of vehicle state transitions;
    initializing an online state value network and dispatching a plurality of vehicles according to the online state value network for a period of time;
    training the online state value network based on vehicle states of the plurality of vehicles before and after the dispatching and rewards associated with the dispatching;
    ensembling the trained online state value network and the offline state value network to obtain an ensembled online state value network; dispatching the plurality of vehicles according to the ensembled online state value network for a second period of time to obtain online training data; and
    retraining the online state value network using the online training data obtained from the second period of time, and ensembling the retrained online state value network and the offline state value network to serve vehicle dispatching for a next period of time;
    wherein the online state value network is retrained more frequently than the offline state value network.

2. The method of claim 1, further comprising:
    training the offline state value network, wherein the training of the offline state value network comprises:
        extracting the plurality of vehicle state transitions from the plurality of historical vehicle trajectories;
        for each vehicle state transition extracted from the plurality of historical vehicle trajectories, determining, using the offline state value network, a first vehicle state value before the each vehicle state transition and a second vehicle state value after the each vehicle state transition,
        constructing an objective function based on a squared error of the first vehicle state value, the second vehicle state value, and a reward associated with the each vehicle state transition; and
        updating parameters of the offline state value network to minimize the objective function.

3. The method of claim 2, wherein the each vehicle state transition comprises an initial vehicle state, a next vehicle state, and the reward for transitioning from the initial vehicle state to the next vehicle state.

4. The method of claim 3, wherein the determining the first vehicle state value using the offline state value network comprises:
    inputting the initial vehicle state and a timestamp associated with the initial vehicle state into the offline state value network to determine the first vehicle state value.

5. The method of claim 1, wherein the offline state value network comprises a series of state value functions corresponding to a series of time points.

6. The method of claim 5, wherein the ensembling the trained online state value network and the offline state value network comprises:
    ensembling the trained online state value network and one of the series of state value functions corresponding to a current time point.

7. The method of claim 1, wherein the training the online state value network based on vehicle states of the plurality of vehicles before and after the dispatching and rewards associated with the dispatching comprises:
    for each of the plurality of vehicles:
        determining a first vehicle state value using the online state value network based on the vehicle state before the dispatching;
        determining a second vehicle state value using the online state value network based on the vehicle state after the dispatching; and
        determining a temporal difference (TD) error based on the first vehicle state value, the second vehicle state value, and a reward associated with the dispatching;
    constructing an objective function based on the plurality of TD errors; and
    updating parameters of the online state value network using gradient descent to minimize the objective function.

8. The method of claim 1, wherein an episode of vehicle dispatching comprises a plurality of dispatch rounds, the training of the online state value network is performed after every first predetermined number of dispatch rounds, and the ensembling of the trained online state value network and the offline state value network is performed after every second predetermined number of dispatch rounds, the second predetermined number being greater than the first predetermined number.

9. The method of claim 1, further comprising:
    determining, within an episode of vehicle dispatching, a plurality of time points for ensembling; and
    the ensembling the trained online state value network and the offline state value network comprises:

determining whether a current time point is one of the plurality of time points; and in response to the current time point being one of the plurality of time points, performing the ensembling of the trained online state value network and the offline state value network.

10. The method of claim 1, wherein the dispatching the plurality of vehicles comprises:

assigning one or more of the plurality of vehicles to serve one or more pending ride orders or repositioning one or more of the plurality of vehicles.

11. The method of claim 10, wherein the repositioning one or more vehicles is performed at a lower frequency than the assigning one or more vehicles to serve the one or more pending ride orders.

12. The method of claim 10, wherein the assigning the one or more of the plurality of vehicles to serve the one or more pending ride orders comprises:

for each assigned pair comprising a pending ride order and one of the one or more vehicles, determining a dispatching value using the online state value network;

constructing an objective function comprising a plurality of dispatching values respectively corresponding to a plurality of decision variables;

determining the plurality of decision variables that maximizes the objective function; and assigning the one or more of the plurality of vehicles to serve the one or more pending ride orders according to the plurality of decision variables.

13. The method of claim 10, wherein the repositioning the one or more of the plurality of vehicles comprises:

identifying one or more of the plurality of vehicles with idle time exceeding a time threshold;

for each of the one or more identified vehicles, determining a plurality of repositioning values corresponding to repositioning the each of the one or more identified vehicles vehicle to a plurality of candidate destinations;

sampling one of the plurality of candidate destinations with a probability proportional to a repositioning value corresponding to the one candidate destination; and repositioning the each vehicle to the one sampled candidate destination.

14. One or more non-transitory computer-readable storage media storing instructions executable by one or more processors, wherein execution of the instructions causes the one or more processors to perform operations comprising:

obtaining an offline state value network for predicting a value of a vehicle state, the offline state value network being trained based on a plurality of historical vehicle trajectories wherein the plurality of historical vehicle trajectories comprises a plurality of vehicle state transitions;

initializing an online state value network and dispatching a plurality of vehicles according to the online state value network for a period of time;

training the online state value network based on vehicle states of the plurality of vehicles before and after the dispatching and rewards associated with the dispatching;

ensembling the trained online state value network and the offline state value network to obtain an ensembled online state value network;

dispatching the plurality of vehicles according to the ensembled online state value network for a second period of time to obtain online training data; and retraining the online state value network using the online training data obtained from the second period of time, and ensembling the retrained online state value network and the offline state value network to serve vehicle dispatching for a next period of time;

wherein the online state value network is retrained more frequently than the offline state value network.

15. The storage media of claim 14, wherein the operations further comprise:

training the offline state value network, wherein the training of the offline state value network comprises:

extracting the plurality of vehicle state transitions from the plurality of historical vehicle trajectories;

for each vehicle state transition extracted from the plurality of historical vehicle trajectories, determining, using the offline state value network, a first vehicle state value before the each vehicle state transition and a second vehicle state value after the each vehicle state transition, constructing an objective function based on a squared error of the first vehicle state value, the second vehicle state value, and a reward associated with the each vehicle state transition; and updating parameters of the offline state value network to minimize the objective function.

16. The storage media of claim 14, wherein the offline state value network comprises a series of state value functions corresponding to a series of time points.

17. The storage media of claim 16, wherein the ensembling the trained online state value network and the offline state value network comprises:

ensembling the trained online state value network and one of the series of state value functions corresponding to a current time point.

18. The storage media of claim 14, wherein the training the online state value network based on vehicle states of the plurality of vehicles before and after the dispatching and rewards associated with the dispatching comprises:

for each of the plurality of vehicles:

determining a first vehicle state value using the online state value network based on the vehicle state before the dispatching;

determining a second vehicle state value using the online state value network based on the vehicle state after the dispatching; and determining a temporal difference (TD) error based on the first vehicle state value, the second vehicle state value, and a reward associated with the dispatching;

constructing an objective function based on the plurality of TD errors; and updating parameters of the online state value network using gradient descent to minimize the objective function.

19. A system comprising one or more processors and one or more non-transitory computer-readable memories coupled to the one or more processors and configured with instructions executable by the one or more processors to cause the system to perform operations comprising:

obtaining an offline state value network for predicting a value of a vehicle state, the offline state value network being trained based on a plurality of historical vehicle trajectories wherein the plurality of historical vehicle trajectories comprises a plurality of vehicle state transitions;

initializing an online state value network and dispatching a plurality of vehicles according to the online state value network for a period of time;

training the online state value network based on vehicle states of the plurality of vehicles before and after the dispatching and rewards associated with the dispatching;

ensembling the trained online state value network and the offline state value network to obtain an ensembled online state value network;

dispatching the plurality of vehicles according to the ensembled online state value network for a second period of time to obtain online training data; and retraining the online state value network using the online training data obtained from the second period of time, and ensembling the retrained online state value network and the offline state value network to serve vehicle dispatching for a next period of time;

wherein the online state value network is retrained more frequently than the offline state value network.

20. The system of claim 19, wherein the operations further comprise:

training the offline state value network, wherein the training of the offline state value network comprises:

extracting the plurality of vehicle state transitions from the plurality of historical vehicle trajectories;

for each vehicle state transition extracted from the plurality of historical vehicle trajectories, determining, using the offline state value network, a first vehicle state value before the each vehicle state transition and a second vehicle state value after the each vehicle state transition, constructing an objective function based on a squared error of the first vehicle state value, the second vehicle state value, and a reward associated with the each vehicle state transition; and updating parameters of the offline state value network to minimize the objective function.

* * * * *